United States Patent

Meyers

[15] 3,638,427
[45] Feb. 1, 1972

[54] SPOOL VALVE CONTROL FOR A HYDRAULIC POWER BOOST

[72] Inventor: Robert E. Meyers, South Bend, Ind.
[73] Assignee: The Bendix Corporation
[22] Filed: Apr. 27, 1970
[21] Appl. No.: 32,241

[52] U.S. Cl. ............................................60/54.6 P, 60/52 B
[51] Int. Cl. ..............................................................F15b 7/00
[58] Field of Search .........................60/54.6 P, 52 B, 54.5 P; 188/358, 359

[56] References Cited

UNITED STATES PATENTS

| 3,064,431 | 11/1962 | Schnell | 60/52 B |
| 2,853,977 | 9/1958 | Sadler | 60/54.6 P |

FOREIGN PATENTS OR APPLICATIONS

| 765,079 | 1/1957 | Great Britain | 60/54.6 P |

*Primary Examiner*—Edgar W. Geoghegan
*Assistant Examiner*—A. M. Zupcic
*Attorney*—William N. Antonis and Plante, Hartz, Smith, and Thompson

[57] ABSTRACT

A control for a hydraulic power boost assembly in a braking system. Located within a housing of the boost assembly is a control piston which has a projection extending therefrom for abutting a spool valve in a valve chamber. The spool valve is responsive to movement of a brake pedal and regulates hydraulic fluid pressure to move a power piston which activates the master cylinder which in turn supplies fluid pressure to the wheel cylinders of a vehicle. The control piston is a stepped diameter piston which has one end thereof exposed to the fluid pressure in the master cylinder and the other end thereof exposed to the fluid pressure acting on the power piston. Upon manual activation by the brake pedal, the fluid pressure from the master cylinder moves the stepped control piston into engagement with the spool valve thereby preventing it from moving until the brake pedal is released. Such an arrangement prevents sudden surges of hydraulic fluid to the power piston in the power chamber which would cause an abrupt stop of the vehicle.

12 Claims, 2 Drawing Figures

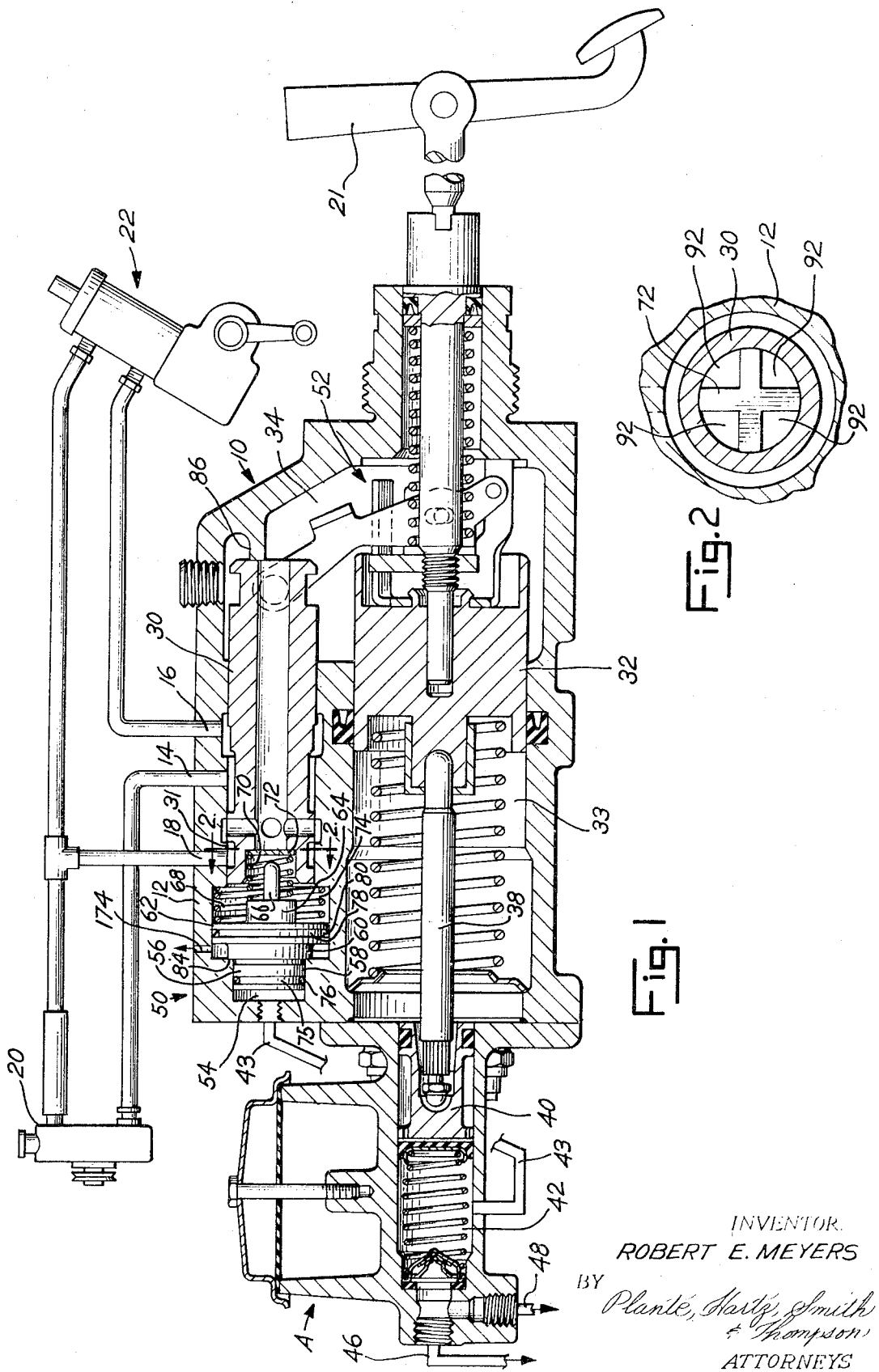

2

3,638,427

SPOOL VALVE CONTROL FOR A HYDRAULIC POWER BOOST

BACKGROUND OF THE INVENTION

In prior art power boost mechanisms for braking systems which receive hydraulic fluid pressure from a pump operatively connected to the engine of a vehicle, when the engine is not operating, the master cylinder must be manually activated. Upon activation, the master cylinder alone supplies fluid pressure to the brake line. The time required to stop a moving vehicle is in direct proportion to the amount of force applied to the master cylinder. The force required to activate the master cylinder is quite different without power than with power. If the car engine stops during the period of deceleration, by the time the driver adjusts to the change in applied force needed to actuate the master cylinder, the vehicle could travel a considerable distance. During this deceleration period, if the stalled engine were started again with the actuating means positioned to manually activate the master cylinder, a sudden surge of hydraulic fluid pressure would be communicated to the power piston, thereby providing the master cylinder with an immediate increased applied force and an instantaneous rise in brake line pressure. With this instantaneous higher brake line pressure, the wheel brakes will abruptly stop the vehicle with possible injury to both the occupants and vehicle with possible injury to both the occupants and vehicle.

To prevent this sudden surge of hydraulic fluid into a brake booster, in my copending U.S. Pat. application Ser. No. 17,486 [BRS-73 & 85], filed Mar. 9, 1970, incorporated herein by reference and owned by the common assignee of this application, I have provided a lever under spring load which moves a sleeve to close the communication of hydraulic fluid from the spool valve to the power boost chamber when the engine of the vehicle is stopped. As disclosed, the control of the spool valve is mechanically responsive to a predetermined spring force.

SUMMARY OF THE INVENTION

In this invention I have provided a power boost device which utilizes brake line pressure from a master cylinder to control movement of a stepped diameter piston located within the power boost device. This stepped diameter piston abuts a brake control valve and prevents movement thereof upon brake pedal application when the pressure differential between the brake line pressure and the fluid pressure in the power boost device exceeds a predetermined value upon brake pedal application. Once the stepped piston has engaged the spool valve, this contact is maintained until the brake pedal is released. Upon release of the brake pedal the spool valve and stepped piston are resiliently urged against stops in the rest position.

Therefore, it is an important object of my invention to provide a mechanism for sensing the loss of hydraulic fluid pressure in a brake booster upon brake pedal application and to prevent movement of the valve which regulates the flow of hydraulic fluid to the power piston therein until after the operation has released the brake pedal.

It is another object of this invention to provide means for preventing abrupt stops when manual brake application is initiated prior to having hydraulic fluid pressure available.

These and other objects will be readily apparent to those skilled in the art upon reading the specification and viewing the drawings.

DESCRIPTION OF THE DRAWINGS

FIG. 1 is a schematic view of a hydraulic brake system for a vehicle with a power booster made pursuant to my present invention illustrated in cross section; and FIG. 2 is a cross-sectional view taken along line 2—2 of FIG. 1.

DETAILED DESCRIPTION

In the braking system shown in FIG. 1, a pump 20 supplies hydraulic fluid to both the brake booster 10 and the power-steering mechanism 22. The brake booster 10 has a housing 12 having an inlet port 14, an outlet port 16 and an exhaust port 18. The inlet port 14 is communicated with the high-pressure side of the pump 20 while the outlet port 16 is in communication with the inlet of the power-steering mechanism 22. The exhaust port 18 and the outlet port from the steering mechanism 22 are joined to the low-pressure side of the pump 20.

The brake booster housing 12 includes a bore 31 having a spool valve 30 therein which moves in a manner described in U.S. Pat. application Ser. No. 38,088 [BRS-79-68], filed May 18, 1970, and owned by the common assignee of this application and incorporated herein by reference. The spool valve 30 schedules hydraulic fluid through chamber 34 to piston member 32 which is slidable in power chamber 33. Piston member 32 is operatively attached to a piston 40 located in compression chamber 42 of a master cylinder A which supplies fluid pressure to the wheel cylinders (not shown) of the vehicle through brake lines 46 and 48. Control means 50 adjacent the bore 31 is connected to chamber 42 of the master cylinder through conduit 43. Control means 50 limits the movement of the spool valve 30 in response to the difference in pressure between the hydraulic fluid pressure in the bore 31 and the fluid pressure supplied to the brake lines 46 and 48.

More particularly, control means 50 includes a control chamber 54, which is operatively connected to the master cylinder through the conduit 43 for receiving the same fluid pressure supplied to the wheel cylinder. A stepped piston member 56 located in chamber 54 has different diameters 58, 60, 62 and 64 with a stem 66 projecting from diameter 64. A piston return spring 68 abuts diameter 62 while a valve return spring 70 surrounds stem 66 and abuts an X-shaped stop member 72, shown more clearly in FIG. 2.

Stepped diameter piston member 56 which extends across a vent port 174 in housing 12, separates control chamber 54 from hydraulic fluid chamber 74 in valve chamber 31. The section of piston member 56 having diameter 58 has a groove 75 positioning ring 76 for sealing chamber 54 from the vent port 174 while diameter 62 has groove 78 positioning ring 80 for sealing chamber 74. In the event either hydraulic fluid or brake fluid would bypass sealing rings 76 and 78, vent port 174 is opened to the atmosphere preventing the possibility of intermingling of these separate and distinct fluids. Stepped diameter piston return spring 68 is retained in hydraulic chamber 74 and biases the stepped piston to the left, as viewed in FIG. 1, until diameter 60 abuts wall 84 in the rest position. Valve return spring 70 which surrounds stem 66 of the stepped diameter piston member 56, has one end retained by a seat on diameter 64 while the other end is held against the X-shaped stop member 72 for biasing the spool valve 30 against stop 86 in the rest position.

MODE OF OPERATION

When the engine of the vehicle is running and pump 20 is in operation, high-pressure hydraulic fluid is available at inlet port 14. Upon activation of the brake pedal 21 by an operator, the activating means 52, which is of a type disclosed in U.S. application Ser. No. 35,800 [BRS-69-82, 83 & 84], filed May 8, 1970, owned by the common assignee of the invention and incorporated by reference, moves the spool valve to the left, as viewed in FIG. 1, causing hydraulic fluid to flow to chamber 34. This hydraulic fluid acts on power piston 32 which in turn moves piston 40 in the master cylinder, thereby providing the brake line pressure needed to stop a vehicle. At the same time hydraulic fluid pressure passes through passages 92 of the X-shaped stop member 72, shown in FIG. 2, into hydraulic fluid chamber 74. This hydraulic fluid acts on the area of diameter 62 of the stepped piston member 56 while the brake line pressure acts on the area of diameter 58. Since the piston has a larger area 62 acting with a greater force, the stepped piston remains seated against wall 84.

Upon stoppage of the engine, hydraulic fluid pressure is not produced by pump 20. Now, when the operator applies the brakes, manual movement of piston 40 in the master cylinder is required to produce the brake line pressure for stopping the vehicle. Since the control means 50 receives this same brake line pressure in control chamber 54, a pressure differential will exist across the stepped diameter member piston 56. This pressure differential will move stem 66 into engagement with the X-shaped stop member 72 to prevent the spool valve 30 from moving even if the engine in the meantime has again been started since communication with inlet port 14 is now closed. Thus, a sudden surge of hydraulic fluid is prevented from operating the power piston 32. Upon release of the brake pedal the stepped piston member 56 is returned to the rest position.

I claim:

1. A hydraulic fluid power boost mechanism for energizing a master cylinder which supplies pressure to the wheel cylinders of a vehicle, comprising:
    a housing having a power chamber and a valve chamber;
    piston means located in the power chamber and operatively connected to the master cylinder;
    valve means located in the valve chamber for controlling flow of fluid to said power chamber which acts on said piston means;
    actuating means controlled by an operator and operatively connected to said valve means and said piston means;
    control means operatively connected to said valve means and responsive to the pressure in said master cylinder in the absence of pressure in said power chamber for preventing movement of said valve means when the pressure in the master cylinder exceeds a predetermined value;
    a control chamber adjacent said valve chamber; and
    a stepped diameter piston located in said control means which engages said valve means and has one side thereof exposed to the fluid pressure in said master cylinder and the other side thereof exposed to the fluid pressure in said power chamber for limiting the operation of said valve means.

2. The structure, as recited in claim 1, wherein said housing includes:
    a vent port located between the ends of said stepped diameter piston for preventing mixing of the master cylinder fluid and the brake booster fluid.

3. The structure, as recited in claim 2, which includes:
    resilient means located between the stepped piston and the valve means for biasing said valve means against a stop in the valve chamber.

4. A power boost assembly for a braking system, comprising:
    a housing having a power chamber and a valve chamber therein, said valve chamber being connected to a fluid pressure source;
    a piston member located in said power chamber;
    actuating means controlled by an operator;
    valve means located in said valve chamber for regulating fluid flow from said fluid pressure source to said piston member in response to movement of said actuating means;
    a control chamber in the housing in communication with fluid pressure in said braking system; and
    pressure responsive means located in said control chamber and operatively connected to said valve means, said pressure responsive means being exposed to and movably responsive to the pressure existing in said braking system and for limiting movement of said valve means, said pressure responsive means having a stepped diameter piston having the large diameter side thereof exposed to the pressure in said valve chamber and the small diameter side thereof exposed to the pressure in said braking system so that the piston is normally urged away from said valve means.

5. In a power boost assembly, as recited in claim 4, wherein said housing includes:
    a vent port located between the ends of said stepped diameter piston, which ends are sealed in said control chamber and said valve chamber, for preventing mixing of the brake system fluid and the fluid in the valve chamber.

6. In a power boost assembly, as recited in claim 5, which includes:
    a stem member connected to said stepped diameter piston;
    a stop member on said valve means which permits fluid pressure to flow from said valve chamber to said large diameter side of said stepped piston; and
    a resilient member located between said stem member and said stop member for biasing said stepped diameter piston and said valve means away from each other and against stops in said housing.

7. In a power boost assembly, as recited in claim 6 wherein said actuating means mechanically operates a master cylinder thereby producing fluid pressure in said control chamber of sufficient magnitude to move the resiliently biased stepped diameter piston into engagement with said valve means and thereby preventing the valve means from moving until said actuating means is released.

8. In a power boost assembly, as recited in claim 4 wherein said pressure responsive means includes:
    a stem member having one side exposed to pressure in said valve chamber and the other side exposed to the pressure in said braking system, said stem member engaging said valve means when the differential pressure between said braking system and said valve chamber is above a predetermined value.

9. In a power boost assembly, as recited in claim 8 which includes:
    a resilient member located between said stem member and said valve means for biasing said valve means against a stop in the valve chamber.

10. In a power boost assembly, as recited in claim 9 which includes:
    a master cylinder operatively connected to said actuating means for supplying fluid to said braking system, said master cylinder upon mechanical actuation producing fluid pressure in said control chamber of sufficient magnitude to move the resiliently biased stem member into engagement with said valve means thereby preventing said valve means from moving during mechanical activation.

11. A power booster for use in a braking system having valve means for regulating fluid pressure to piston means connected to a master cylinder supplying brake line pressure to the individual wheels of said system, comprising:
    a housing having a valve bore and a piston bore, said piston means being located in said piston bore, said valve means being located in said valve bore;
    lever means connecting said valve means with said piston means;
    actuating means connected to said lever means, said actuating means being responsive to an operator applied force to energize said master cylinder; and
    pressure responsive means operatively connected to said valve means and said master cylinder, said pressure responsive means having one side exposed to fluid pressure in said valve bore and another side exposed to brake line pressure from said master cylinder for controlling movement of said valve means in proportion to the pressure differential across said pressure responsive means.

12. The structure as defined in claim 11, wherein said pressure responsive means includes:
    a piston member sealed in said valve bore opposite said valve means; and
    a resilient member for biasing said piston member away from said valve means, said brake line pressure needing to overcome the force of said resilient member and said fluid pressure in said valve bore to move said piston member into a limiting position with said valve means.

* * * * *